(12) United States Patent
Matsuura et al.

(10) Patent No.: US 11,014,410 B2
(45) Date of Patent: May 25, 2021

(54) TIRE

(71) Applicant: Sumitomo Rubber Industries, Ltd., Hyogo (JP)

(72) Inventors: Koji Matsuura, Kobe (JP); Tomoyuki Kujime, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 358 days.

(21) Appl. No.: 16/112,355

(22) Filed: Aug. 24, 2018

(65) Prior Publication Data

US 2019/0084353 A1 Mar. 21, 2019

(30) Foreign Application Priority Data

Sep. 15, 2017 (JP) .............................. JP2017-178026

(51) Int. Cl.
*B60C 11/12* (2006.01)
*B60C 11/03* (2006.01)

(52) U.S. Cl.
CPC ........ B60C 11/0302 (2013.01); B60C 11/032 (2013.01); B60C 11/125 (2013.01); B60C 11/1236 (2013.01); B60C 11/1272 (2013.01); B60C 11/1281 (2013.01); *B60C 2011/039* (2013.01); *B60C 2011/0358* (2013.01); *B60C 2011/0381* (2013.01); *B60C 2011/0388* (2013.01); *B60C 2011/129* (2013.01)

(58) Field of Classification Search
CPC .............. B60C 11/0302; B60C 11/032; B60C 11/1236; B60C 11/1281; B60C 2011/0381; B60C 2011/0388; B60C 2011/1254

See application file for complete search history.

(56) References Cited

U.S. PATENT DOCUMENTS

| | | | |
|---|---|---|---|
| 2006/0137791 A1* | 6/2006 | Miyabe | B60C 11/0318 152/209.18 |
| 2006/0254684 A1* | 11/2006 | Tamura | B60C 11/1369 152/209.18 |
| 2014/0283966 A1 | 9/2014 | Horiguchi | |
| 2016/0152092 A1* | 6/2016 | Sasaki | B60C 11/0304 152/209.18 |

(Continued)

FOREIGN PATENT DOCUMENTS

| | | | |
|---|---|---|---|
| EP | 3153334 A1 | | 4/2017 |
| FR | 3035823 | * | 11/2016 |

(Continued)

OTHER PUBLICATIONS

Extended European Search Report issued by the European Patent Office dated Nov. 30, 2018, which corresponds to EP18189739.8-1012 and is related to U.S. Appl. No. 16/112,355.

*Primary Examiner* — Robert C Dye
(74) *Attorney, Agent, or Firm* — Studebaker & Brackett PC (57) ABSTRACT

A tire comprises a tread portion provided with two circumferential grooves disposed one each side of the tire equator and extending continuously in the tire circumferential direction, and a crown land region between the two circumferential grooves. The crown land region is provided with first crown sipes extending from one of the circumferential grooves and terminating within the crown land region, and second crown sipes extending from the other circumferential groove and terminating within the crown land region.

18 Claims, 6 Drawing Sheets

(56) References Cited

U.S. PATENT DOCUMENTS

| | | | |
|---|---|---|---|
| 2016/0236517 A1* | 8/2016 | Nagase | B60C 11/0304 |
| 2016/0303918 A1* | 10/2016 | Hayashi | B60C 11/1323 |
| 2018/0126790 A1* | 5/2018 | Muhlhoff | B60C 11/0306 |
| 2018/0134089 A1* | 5/2018 | Durand-Gasselin | B60C 11/1236 |
| 2018/0281526 A1* | 10/2018 | Muhlhoff | B60C 11/1236 |
| 2018/0339556 A1* | 11/2018 | Mizushima | B60C 11/0306 |

FOREIGN PATENT DOCUMENTS

| | | |
|---|---|---|
| JP | 2013-173394 A | 9/2013 |
| WO | 2016/177977 A1 | 11/2016 |

\* cited by examiner

TIRE

TECHNICAL FIELD

The present invention relates to a tire, more particularly to a tread pattern suitable for sporty use such as circuit racing.

BACKGROUND ART

The following patent document 1 discloses a tire whose running performance during circuit running is improved, while securing wet performance. This tire is provided with two circumferential grooves one on each side of the tire equator, and oblique grooves disposed axially outside the circumferential grooves. Between the two circumferential grooves, there is formed a land region extending in the tire circumferential direction on the tire equator. Such tire has a problem such that the temperature of the land region of the tread portion is hard to increase and thereby the tire has low grip performance initially after starting to run.

Patent document 1:

Japanese Patent Application Publication No.2013-173394

SUMMARY OF THE INVENTION

Problems to be Resolved by the Invention

It is therefore, an object of the present invention to provide a tire capable of exerting high grip performance even immediately after starting to run.

According to the present invention, a tire comprises a tread portion provided with two circumferential grooves disposed one each side of the tire equator and extending continuously in the tire circumferential direction, and a crown land region formed between the two circumferential grooves, wherein
the crown land region is provided with
first crown sipes extending from one of the circumferential grooves and terminating within the crown land region, and
second crown sipes extending from the other circumferential groove and terminating within the crown land region.

It is preferable that the tread portion comprises a shoulder land region positioned on each side of the crown land region and comprising a continuous part extending continuously in the tire circumferential direction.

It is preferable that the first crown sipes or the second crown sipes are inclined with respect to the tire axial direction.

It is preferable that the first crown sipes and the second crown sipes extend from the circumferential grooves while inclining to one side in the tire circumferential direction.

It is preferable that the tire has a tread pattern having an intended rotational direction, and the first crown sipes and the second crown sipes extend from the circumferential grooves while inclining to the opposite direction to the intended rotational direction (toward the toe-side).

It is preferable that the first crown sipes or the second crown sipes are each provided with
a major radial portion extending radially outwardly from the bottom of the sipe with a constant width, and
a radially outermost radial portion opened at the tread face of the tread portion with a width more than the constant width of the major radial portion.

It is preferable that the width of the major radial portion is 0.2 to 1.0 mm.

It is preferable that the first crown sipes and the second crown sipes each have an axially inner end within the crown land region, and
the distances in the tire circumferential direction between the axially inner ends of the first crown sipes and the axially inner ends of the second crown sipes are not more than 5 mm.

It is preferable that the first crown sipes and the second crown sipes each have an axially inner end within the crown land region, and
the distance in the tire axial direction between the axially inner ends of the first crown sipes and the axially inner ends of the second crown sipes is more than the length in the tire axial direction of the first crown sipes and more than the length in the tire axial direction of the second crown sipes.

It is preferable that the tread portion comprises a shoulder land region positioned on each side of the crown land region, and provided with oblique grooves inclined with respect to the tire axial direction and positioned in the tire circumferential direction so that
the circumferential extents of the oblique grooves do not overlap in the tire circumferential direction with the circumferential extents of the first and second crown sipes.

It is preferable that the pitch length in the tire circumferential direction of the oblique grooves is more than the pitch length in the tire circumferential direction of the first crown sipes.

DESCRIPTION OF THE PREFERRED EMBODIMENTS

Embodiments of the present invention will now be described in detail in conjunction with the accompanying drawings.

Figure 1:
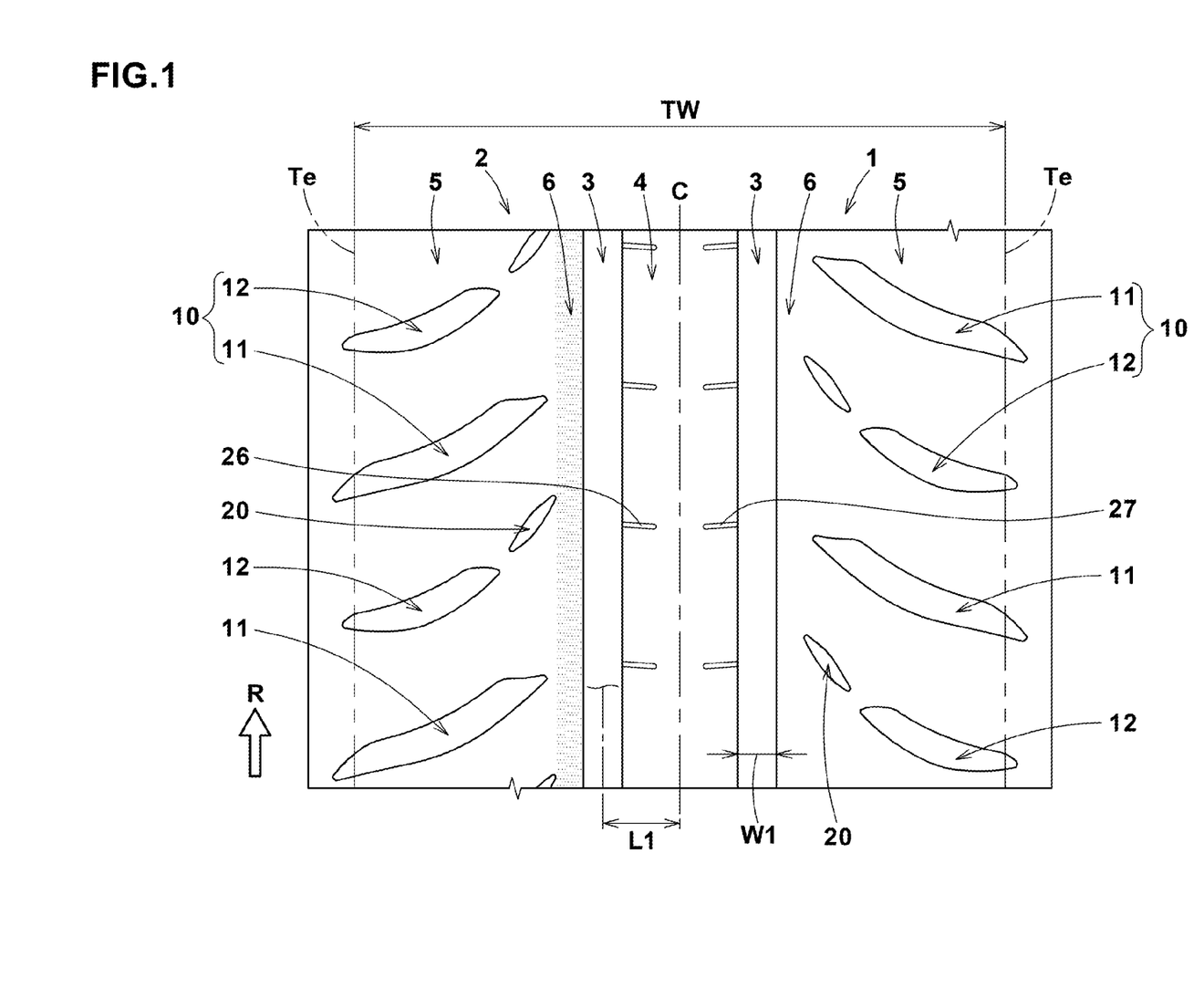
FIG. 1 is a developed partial view of the tread portion of a tire as an embodiment of the present invention.

FIG. 1 shows a part of the tread portion 2 of a tire 1 as an embodiment of the present invention.
The tire 1 in this embodiment is a street-legal high-performance pneumatic tire for passenger cars suitable for sporty use such as circuit racing.
In this embodiment, the tire 1 is provided in the tread portion 2 with a directional tread pattern having an intended tire rotational direction R.
Incidentally, the intended rotational direction R is indicated in the tire sidewall portion (not shown) by markings, characters, symbols and the like.
In this application, the expression "the toe-side in the intended tire rotational direction" means one side in the tire circumferential direction which is toward the opposite direction to the intended tire rotational direction.

The tread portion 2 is provided with two circumferential grooves 3 disposed on each side of the tire equator C and extending continuously in the tire circumferential direction. In this example, each of the circumferential grooves 3 is a straight groove parallel with the tire circumferential direction. However, wavy grooves or zigzag grooves or a combination of two of a wavy groove, a zigzag groove and a straight groove may be employed.

It is preferable that the axial distance L1 from the tire equator C to the widthwise center line of each of the circumferential grooves 3 is set in a range from 0.05 to 0.20 times the tread width TW between the tread edges Te.

The tread edges Te are the axial outermost edges of the ground contacting patch of the tire which occurs under a normally inflated loaded condition when the camber angle of the tire is zero.

The tread width TW is the width measured under a normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

It is preferable that the circumferential grooves 3 each have a groove width w1 of not more than 20% of the tread width TW. More preferably, the groove width w1 is set in a range from 4.0% to 10.0% of the tread width TW.

when the tire 1 is for passenger cars, it is preferable that the circumferential grooves 3 have a groove depth of from 4 to 10 mm.

The tread portion 2 is axially divided by the two circumferential grooves 3 into tow shoulder land regions 5 and one crown land region 4 therebetween.

In this embodiment, each of the shoulder land regions 5 is not divided in the tire axial direction by a circumferentially continuously extending groove. In other word, each shoulder land region 5 is continuous between the circumferential groove 3 and the tread edge Te.

Further, each of the shoulder land regions 5 is continuous in the tire circumferential direction. More specifically, the shoulder land region 5 has a continuous part 6 extending continuously in the tire circumferential direction without any void such as groove and sipe. In FIG. 1, one of the two continuous parts 6 is shaded by thin dot pattern for easy understanding.

The continuous part 6 in this embodiment is formed between the circumferential groove 3 and the oblique grooves disposed in the shoulder land region 5. Thereby, the shoulder land region 5 is provided with a high rigidity portion and helps to improve the steering stability.

In this application including the specification and claims, the term "sipe" means a narrow groove having a width not more than 1.5 mm inclusive of a cut having no substantial width. If a sipe has, in the tire radial direction, a widened portion whose width exceeds 1.5 mm, it is called "sipe" as long as its major portion has a width of not more than 1.5 mm.

Figure 2:
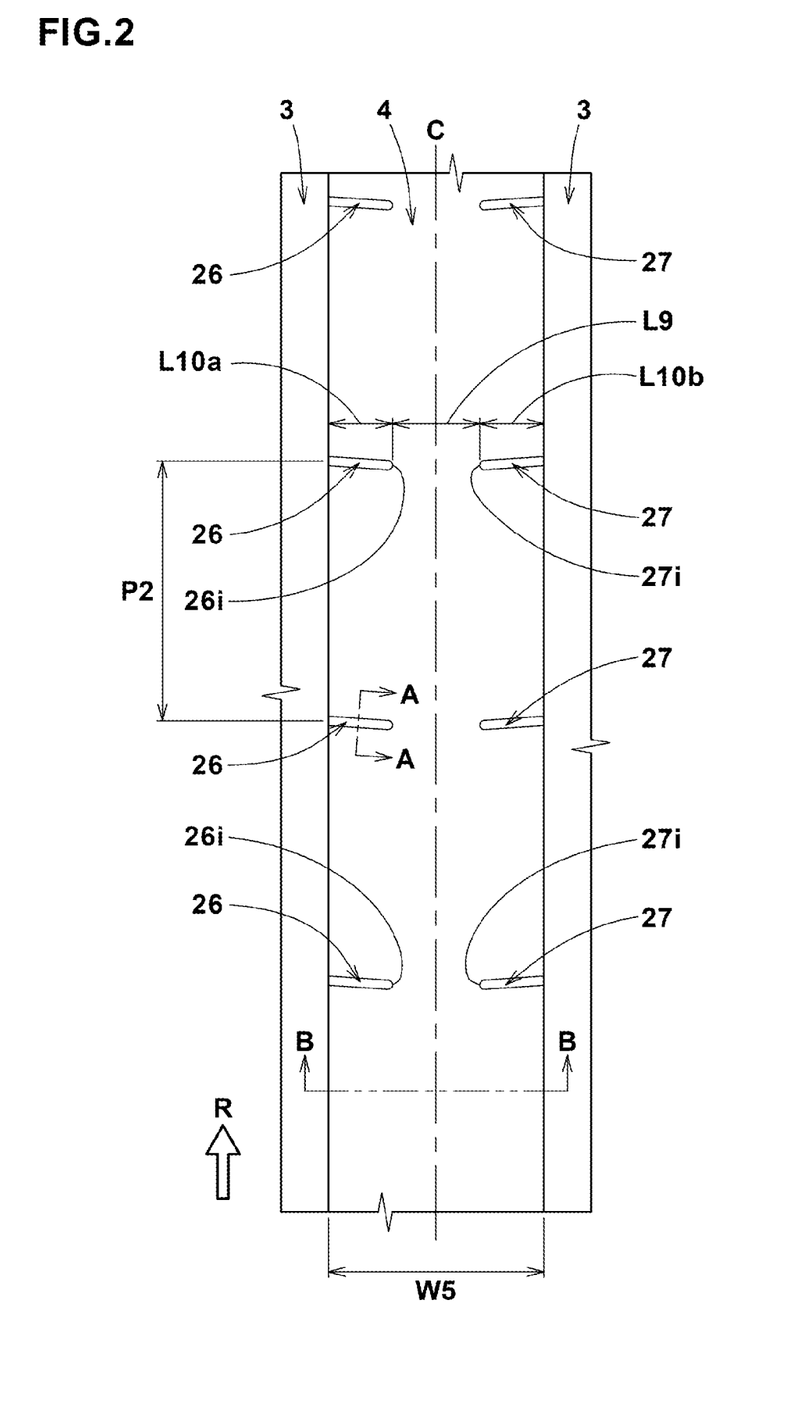
FIG. 2 is a partial top view of the crown land region in FIG. 1.

It is preferable that the crown land region 4 is provided with first crown sipes 26 and second crown sipes 27 as shown in FIG. 2.

The first crown sipes 26 extend from one of the circumferential grooves 3 and terminate within the crown land region 4.

The second crown sipes 27 extend from the other circumferential groove 3 and terminate within the crown land region 4.

The crown land region 4 has a part extending continuously in the tire circumferential direction.

The first and second crown sipes can facilitate the temperature rise of the crown land region 4 immediately after starting to run, while suppressing the decrease in the rigidity of the crown land region 4.

According to the present invention, therefore, the crown land region 4 can exert high grip even immediately after starting to run.

It is preferable that the axial length L10$a$ of the first crown sipes 26 and the axial length L10$b$ of the second crown sipes 27 are set in a range from 0.20 to 0.40 times the axial width w5 of the crown land region 4.

Such first and second crown sipes can increase the grip immediately after starting (hereinafter, referred to as the "initial stage grip"), while suppressing the decrease in the grip when the temperature of the crown land region 4 is sufficiently increased (hereinafter, referred to as the "maximum grip").

In this embodiment, the first crown sipes 26 and second crown sipes 27 are disposed line-symmetrically about the tire equator C, and the first crown sipe 26 and second crown sipe 27 are structurally symmetrical. Thus, although the following description is made mainly on the first crown sipe 26, the description is applicable to the second crown sipe 27, namely, applicable to both of the first crown sipes 26 and the second crown sipes 27.

The crown sipes 26 are inclined with respect to the tire axial direction. It is preferable that the first crown sipes 26 and the second crown sipes 27 are extend from the circumferential grooves 3 while inclining to one side in the tire circumferential direction.

In this embodiment, the crown sipes 26 extend from the circumferential groove 3, while inclining toward the opposite direction to the intended tire rotational direction R.

Preferably, the crown sipes 26 have an angle $\theta 6$ of not more than 10 degrees with respect to the tire axial direction.

Figure 3A:
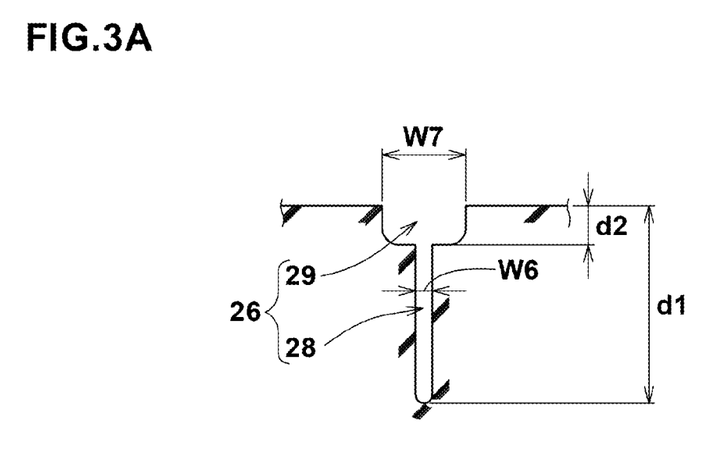
FIG. 3A is a cross sectional view taken along line A-A of FIG. 2.

As shown in FIG. 3A which is a cross sectional view taken along line A-A of FIG. 2, the crown sipe 26 in this embodiment comprises a major portion 28 and a radially outermost portion 29.

The major portion 28 extends radially outwardly from the bottom with a constant width.

The radially outermost portion 29 extends radially outwardly from the major portion 28 to opened at the tread surface of the tread portion 2 with a larger width than the constant width of the major portion 28.

Such crown sipe 26 helps to suppress uneven wear of the crown land region 4.

It is preferable that the major portion 28 has a width w6 of from 0.2 to 1.0 mm. It is preferable that the radially outer portion 29 has a width w7 of from 1.0 to 2.5 mm.

It is preferable that the depth d2 of the radially outer portion 29 is in a range from 0.10 to 0.30 times the depth d1 of the crown sipe 26.

Such crown sipes 26 can speed up the temperature rise of the crown land region 4, while maintaining the above described maximum grip of the crown land region 4.

It is preferable that the depth d1 of the crown sipes 26 is set in a range from 0.40 to 0.80 times the depth of the circumferential grooves 3.

As shown in FIG. 2, the first crown sipes 26 and the second crown sipes 27 each have axially inner end within the crown land region 4.

It is preferable that the distances L8 (not shown) in the tire circumferential direction between the axially inner ends 26i of the first crown sipes 26 and the axially inner ends 27i of the second crown sipes 27 are not more than 5 mm.

By arranging the axially inner ends 26i close to the axially inner ends 27i, the temperature of the crown land region 4 becomes more easily to raise. Consequently, it becomes possible to improve the above described initial stage grip.

It is preferable that the distance L9 in the tire axial direction between the axially inner ends 26i of the first crown sipes 26 and the inner ends 27i of the second crown sipes 27 is more than the axial length L10a of the first crown sipes 26 and more than the axial length L10b of the second crown sipes 27. More specifically, it is preferable that the distance L9 is in a range from 0.40 to 0.50 times the width w5 of the crown land region 4. Such arrangement of the crown sipes can allow the crown land region 4 to maintain the necessary rigidity for good grip performance.

In order to effectively derive the above advantageous effect, it is preferred that the axial width w5 of the crown land region 4 is set in a range from 0.10 to 0.30 times the tread width TW.

Figure 3B:
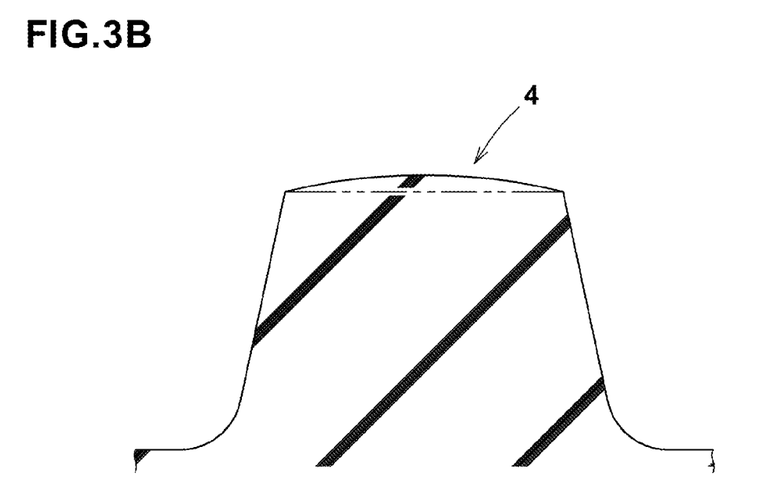
FIG. 3B is a cross sectional view taken along line B-B of FIG. 2.

As shown in FIG. 3B which is a cross sectional view of the crown land region 4 taken along line B-B of FIG. 2, it is preferable that the radially outer surface of the crown land region 4 has a radially outwardly convex arched profile in its cross section.

Such configuration of the crown land region 4 can even the ground pressure to provide good grip performance.

As shown in FIG. 1, the shoulder land regions 5 are each provided with oblique grooves 10 inclined with respect to the tire axial direction. In this embodiment, each of the oblique grooves 10 extends from its axially inner end to outer end, while inclining toward the opposite direction to the intended tire rotational direction R. The oblique grooves 10 are however not limited to such inclining direction.

It is preferable that, in the tire circumferential direction, the circumferential extents of the respective oblique grooves 10 do not overlap with the circumferential extents of the first and second crown sipes 26 and 27 as shown in FIG. 1. Thereby, uneven wear between the land regions 4 and 5 can be suppressed.

The oblique grooves 10 include first oblique grooves 11 and second oblique grooves 12. The first oblique grooves 11 have axially inner ends 11i, and the second oblique grooves 12 have axially inner ends 12i positioned axially outside the inner ends 11i of the first oblique grooves 11.

In this embodiment, the first oblique grooves 11 and the second oblique grooves 12 are arranged alternately in the tire circumferential direction in each shoulder portion.

It is preferable that the pitch length P1 (shown in FIG. 4) in the tire circumferential direction of the oblique grooves 11 is set to be more than the pitch length P2 (shown in FIG. 2) in the tire circumferential direction of the first crown sipes 26. It is preferable that the pitch length P1 of the oblique grooves 11 is set in a range from 1.5 to 2.5 times the pitch length P2 of the first crown sipes 26.

Figure 5:
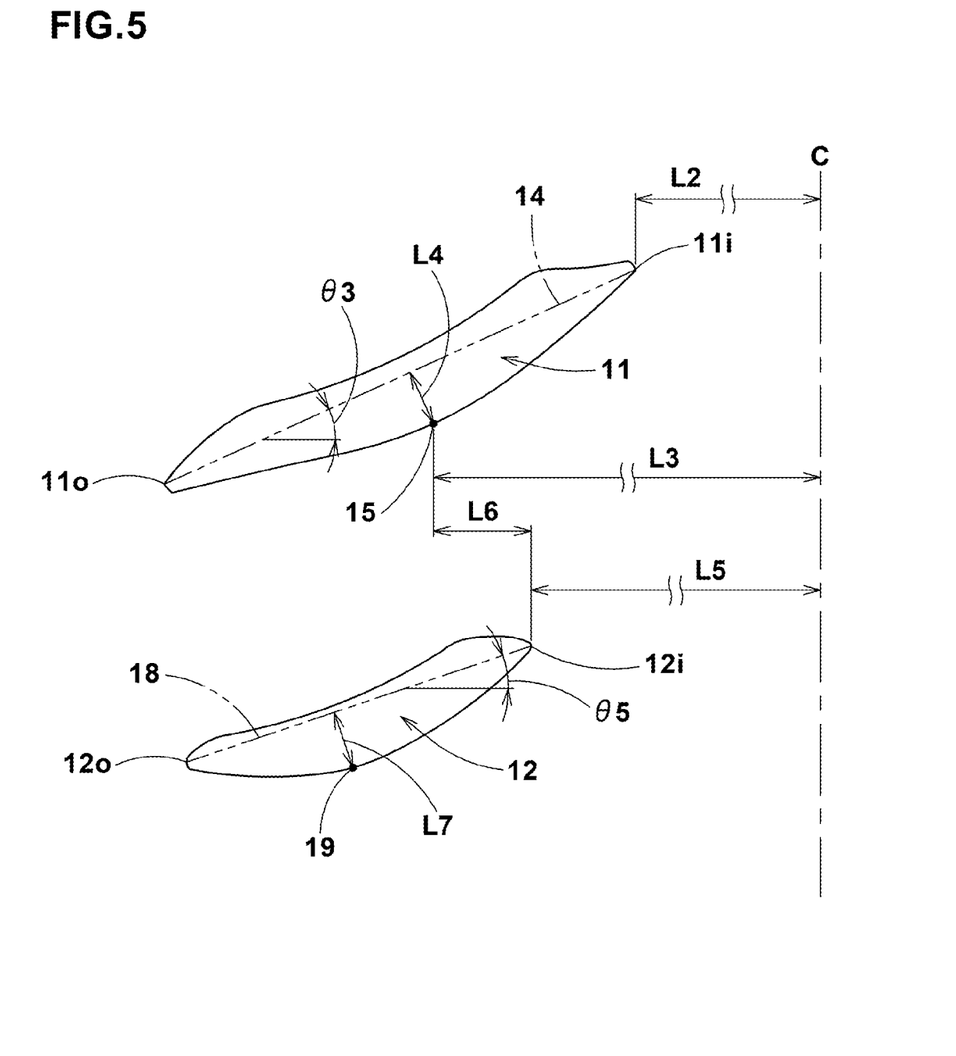
FIG. 5 is an enlarged view showing a first oblique groove and a second oblique groove shown in FIG. 4.

As shown in FIG. 5, the first oblique groove 11 has, on one of the groove edges, a vertex of curve 15 farthest from a straight line 14 drawn between the axially inner end 11i and the axially outer end 11o. And the vertex of curve 15 is positioned axially outside the axially inner end 12i of the second oblique groove 12. Accordingly, in the tire axial direction, the axially inner ends 12i of the second oblique grooves 12 are positioned between the axially inner ends 11i and the vertexes of curve 15 of the first oblique grooves 11.

The axially inner end 11i and the vertex of curve 15 of the first oblique groove 11 and the axially inner end 12i of the second oblique groove 12 are liable to become start positions of deformation of the tread portion 2. By setting their positions as described above, the ground contact of the shoulder land region 5 can be improved. Thereby, the tire 1 can exert good road grip even if the ground pressure of the tread portion 2 is relatively low.

Figure 4:
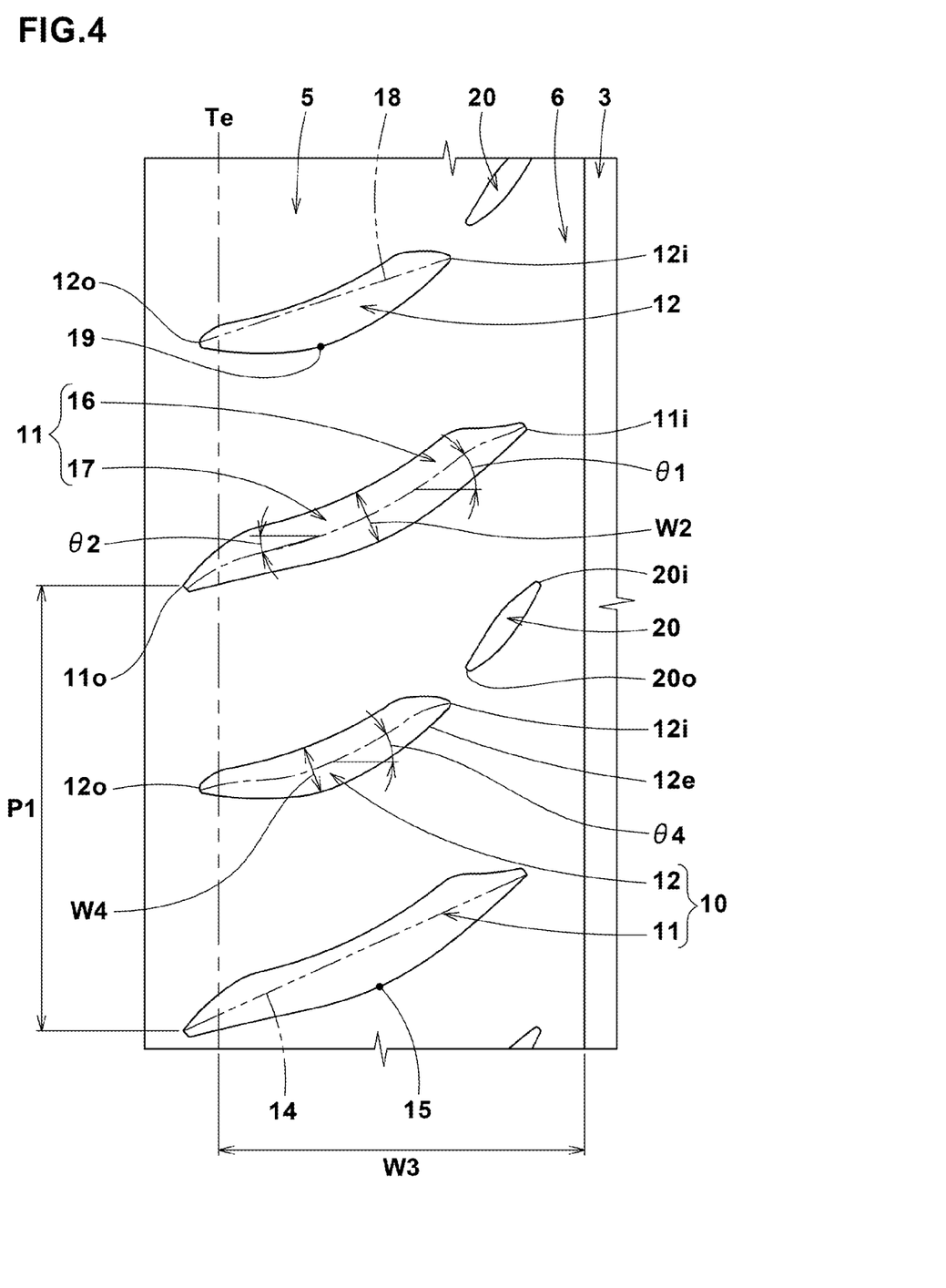
FIG. 4 is a partial top view of the shoulder land region in FIG. 1.

It is preferable that, as shown in FIG. 4, all the first oblique grooves 11 are curved toward the same direction, and the groove edges of the first oblique grooves 11 on the same side in the tire circumferential direction each have no vertex of curve other than the above-said vertex of curve 15. In this embodiment, the first oblique groove 11 is curved such that the angle with respect to the tire axial direction becomes decreased from the axially inner end 11i toward the axially outer end 11o. Preferably, the angle is continuously decreased. The first oblique groove 11 is however not limited to such configuration. It may be possible that the first oblique groove 11 is partly curved and other part is linear.

It is preferable that the axially inner ends 11i of the first oblique grooves 11 terminate within the respective shoulder land regions 5. It is preferable that the axially outer ends 11o of the first oblique grooves 11 are positioned axially outside the respective tread edges Te. Such first oblique grooves 11 can improve the wet performance, while providing good grip performance by maintaining the rigidity of the shoulder land regions 5.

It is preferable that, as shown in FIG. 5, the distance L2 in the tire axial direction from the tire equator C to the axially inner ends 11i of the first oblique grooves 11 is set in a range from 0.10 to 0.30 times the tread width TW, and the distance L3 in the tire axial direction from the tire equator C to the vertex of curve 15 is set in a range from 0.25 to 0.45 times, more preferably 0.30 to 0.40 times the tread width TW.

Such first oblique grooves 11 can improve the wet performance and grip performance on dry roads in good balance.

As shown in FIG. 4, the first oblique groove 11 comprises an axially inside portion 16 on the axially inside of the vertex of curve 15, and an axially outside portion 17 on the axially outside of the vertex of curve 15.

The axially inside portion 16 preferably has an angle θ1 of from 25 to 45 degrees with respect to the tire axial direction. The axially outside portion 17 preferably has an angle θ2 of from 0 to 30 degrees with respect to the tire axial direction.

It is preferable that, as shown in FIG. 5, a straight line 14 drawn between the axially inner end 11i and the axially outer end 11o is inclined at an angle θ3 of from 20 to 30 degrees with respect to the tire axial direction.

It is preferable that the distance L4 from the straight line 14 to the vertex of curve 15 of the first oblique groove 11 is less than the maximum groove width w2 (shown in FIG. 4) of the first oblique groove 11. More specifically, the distance L4 is preferably set in a range from 0.60 to 0.90 times the groove width w2. Such configuration of the first oblique groove 11 can effectively discharge the water in the groove toward the axially outward during running in wet conditions.

In this embodiment, in each shoulder portion 5, the second oblique grooves 12 are inclined to the same direction as the first oblique grooves 11.

It is preferable that, similarly to the first oblique groove 11, the second oblique groove 12 has, on one of the groove edges, a vertex of curve 19 farthest from a straight line 18 drawn between the axially inner end 12i and the axially outer end 12o.

It is preferable that the second oblique grooves 12 are curved toward the same direction, and the angle with respect to the tire axial direction of the second oblique grooves 12 becomes gradually decreased toward the axially outer end 12o from the axially inner end 12i. Preferably, the angle is continuously decreased.

Preferably, the second oblique grooves 12 extend substantially parallel with the first oblique grooves 11.

The axially inner ends 12i of the second oblique grooves 12 terminate within the respective shoulder land regions 5.

It is preferable that the distance L5 in the tire axial direction from the tire equator C to the axially inner ends 12i of the second oblique grooves 12 is set in a range from 0.20 to 0.40 times the tread width TW. Thereby, the ground contacting area of a region on the axially inside of the second oblique grooves 12 are secured to provide good grip performance.

In order to increase the ground contact of the shoulder land regions 5, the distance L6 in the tire axial direction between the axially inner end 12i of the second oblique groove 12 and the vertex of curve 15 of the first oblique groove 11 is preferably not less than 0.10 times, more preferably not less than 0.15 times, but preferably not more than 0.30 times, more preferably not more than 0.25 times the axial width w3 of the shoulder land region 5.

It is preferable that, as shown in FIG. 4, the axially outer ends 12o of the second oblique grooves 12 are positioned axially outside the tread edges Te.

It is preferable that the angle θ4 with respect to the tire axial direction of the second oblique grooves 12 is set in a range from 0 to 45 degrees.

It is preferable that, as shown in FIG. 5, the angle θ5 with respect to the tire axial direction of a straight line 18 drawn between the axially inner end 12i axially outer end 12o of the second oblique groove 12 is in a range from 15 to 25 degrees.

It is preferable that the difference between the angle θ5 of the straight line 18 and the angle θ3 of the straight line 14 drawn between the axially inner end 11i and the axially outer end 11o of the first oblique groove 11, is not more than 10 degrees. Such configuration of the second oblique groove 12 can effectively discharge the water in the groove toward the axial outside during running in wet conditions.

It is preferable that the distance L7 from the straight line 18 to the vertex of curve 19 of the second oblique groove 12 is set in a range from 0.90 to 1.10 times the distance L4 from the straight line 14 to the vertex of curve 15 of the first oblique groove 11. Thereby, uneven wear in the vicinities of the vertexes of curve of the oblique grooves can be prevented.

It is preferable that, as shown in FIG. 4, the maximum groove width w4 of the second oblique groove 12 is less than the maximum groove width w2 of the first oblique groove 11.

More specifically, the groove width w4 of the second oblique groove 12 is preferably set in a range from 0.70 to 0.90 times the groove width w2 of the first oblique groove 11.

Such second oblique grooves 12 can improve the wet performance and the grip performance in good balance.

It is preferable that, for the same reason, the second oblique groove 12 has a groove depth less than that of the first oblique groove 11.

In this embodiment, the shoulder land regions 5 are preferably provided with auxiliary grooves 20.

Each of the auxiliary grooves 20 is positioned, for example, so as to overlap with an extension toward the tire equator C of one of the second oblique grooves 12.

Each of the auxiliary grooves 20 has an axially inner end 20i and outer end 20o within the shoulder land region 5. Preferably, the axially inner end 20i is disposed axially inside the axially inner end 11i of the first oblique groove 11, and the axially outer end 20o is disposed axially outside the axially inner end 11i of the first oblique groove 11.

Such auxiliary grooves 20 can improve the wet performance, while maintaining the rigidity of the continuous part 6 of the shoulder land region 5.

In this example, a part of the groove edge of the auxiliary groove 20 is aligned with an axial groove edge 12e on the toe-side in the rotational direction R, of the second oblique groove 12. Thereby, uneven wear at the groove edges of the second oblique groove 12 and auxiliary groove 20 can be prevented.

While detailed description has been made of preferable embodiments of the present invention, the present invention can be embodied in various forms without being limited to the illustrated embodiments.

Comparison Tests

Figure 6A:
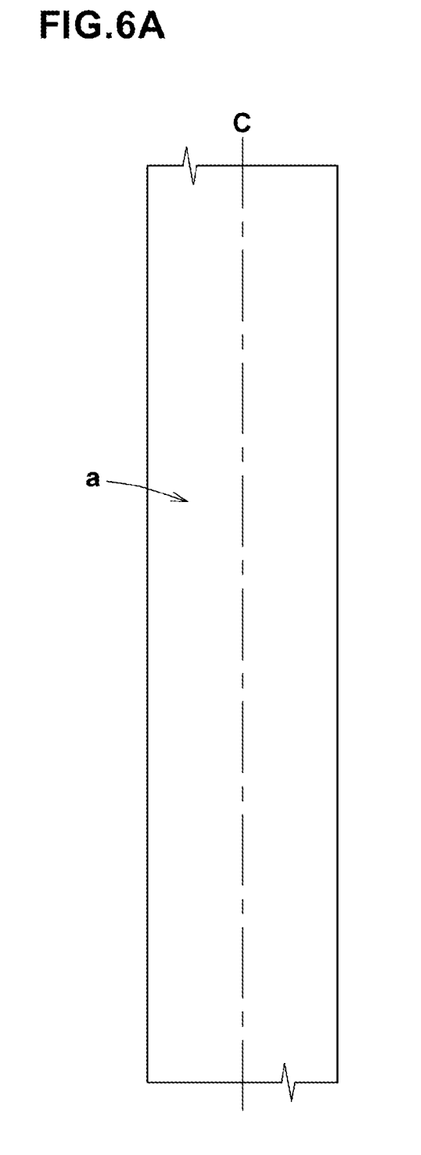
FIG. 6A is a partial top view of the crown land region of comparative example 1.
Figure 6B:
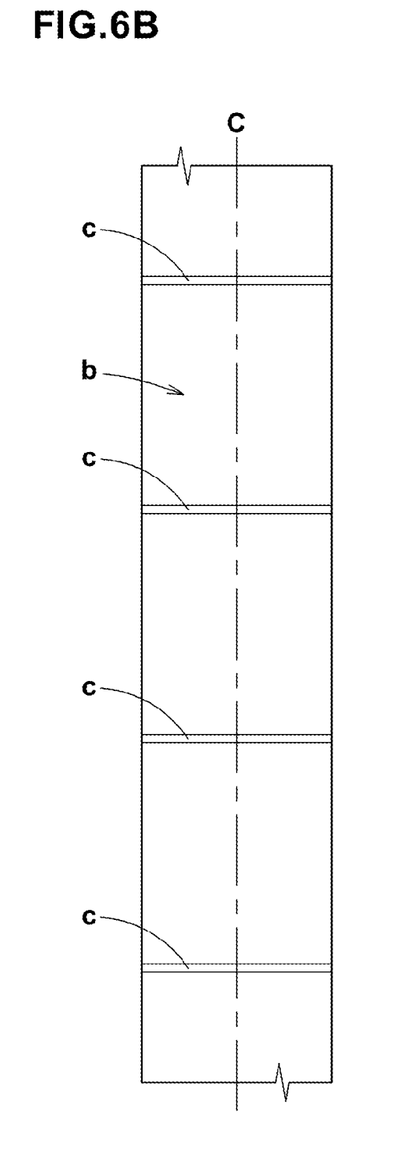
FIG. 6B is a partial top view of the crown land region of comparative example 2.

Based on the tread pattern shown in FIG. 1, pneumatic tires of size 205/55R16 (rim size 16×6.5J) were experimentally manufactured as test tires including: working examples Ex.1-Ex.10, comparative example Ref.1 whose crown land region (a) was devoid of a sipe as shown in FIG. 6A, and comparative example Ref.2 whose crown land region (b) was provided with only sipes (c) extending across the entire width of the crown land region as shown in FIG. 6B. The construction of the shoulder land regions was the same for all the test tires.

The test tires were tested for the initial stage grip and the maximum grip as follows, using a test car (2000cc front engage rear drive passenger car with test tires mounted on all wheels and inflated to 230 kPa).

<Initial Stage Grip and Maximum Grip>

The test car was run on a dry road surface, and the test driver evaluated the grip immediately after starting (initial stage grip) and the grip when the temperature of the tires was sufficiently increased (maximum grip).

The test results are indicated in Table 1 by an index based on Ref.1 being 100, wherein the larger the index number, the better the performance (namely, initial stage grip and maximum grip).

TABLE 1

| Tire | Ref. 1 | Ref. 2 | Ex. 1 | Ex. 2 | Ex. 3 | Ex. 4 |
|---|---|---|---|---|---|---|
| crown land region (FIG. No.) | 6A | 6B | 1 | 1 | 1 | 1 |
| crown sipe lengths L10a, L10b/width W5 | — | — | 0.30 | 0.20 | 0.25 | 0.35 |
| circumferential distance L8(mm) | — | — | 0.0 | 0.0 | 0.0 | 0.0 |
| axial distance L9/width W5 | — | — | 0.40 | 0.60 | 0.50 | 0.30 |
| initial stage grip | 100 | 110 | 108 | 105 | 108 | 108 |
| maximum grip | 100 | 90 | 98 | 98 | 98 | 96 |

| Tire | Ex. 5 | Ex. 6 | Ex. 7 | Ex. 8 | Ex. 9 | Ex. 10 |
|---|---|---|---|---|---|---|
| crown land region (FIG. No.) | 1 | 1 | 1 | 1 | 1 | 1 |
| crown sipe lengths L10a, L10b/width W5 | 0.40 | 0.30 | 0.30 | 0.30 | 0.30 | 0.30 |
| circumferential distance L8(mm) | 0.0 | 3.0 | 5.0 | 10.0 | 15.0 | 20.0 |
| axial distance L9/width W5 | 0.20 | 0.40 | 0.40 | 0.40 | 0.40 | 0.40 |
| initial stage grip | 108 | 108 | 108 | 105 | 104 | 104 |
| maximum grip | 94 | 98 | 98 | 98 | 99 | 99 |

From the test results, it was confirmed that the tires according to the present invention can exert high grip performance immediately after starting, without sacrificing the maximum grip.

REFERENCE SIGNS LIST 2 tread portion
3 circumferential grooves
4 crown land region
26 first crown sipe
27 second crown sipe

The invention claimed is:

1. A tire comprising a tread portion provided with two circumferential grooves disposed one on each side of the tire equator and extending continuously in the tire circumferential direction, and a crown land region formed between the two circumferential grooves, wherein
the crown land region is provided with first crown sipes extending from one of the circumferential grooves and terminating within the crown land region, and second crown sipes extending from the other circumferential groove and terminating within the crown land region;
the tread portion comprises a shoulder land region positioned on each side of the crown land region, and provided with oblique grooves inclined with respect to the tire axial direction and positioned in the tire circumferential direction so that, in the tire circumferential direction, the circumferential extents of the oblique grooves do not overlap with the circumferential extents of the first and second crown sipes; and
the pitch length in the tire circumferential direction of the oblique grooves is more than the pitch length in the tire circumferential direction of the first crown sipes.

2. The tire according to claim 1, wherein
the tread portion comprises a shoulder land region positioned on each side of the crown land region and comprising a continuous part extending continuously in the tire circumferential direction.

3. The tire according to claim 2, wherein
the first crown sipes or the second crown sipes are inclined with respect to the tire axial direction.

4. The tire according to claim 3, wherein
the first crown sipes and the second crown sipes extend from the circumferential grooves while inclining to one side in the tire circumferential direction.

5. The tire according to claim 2, wherein
the first crown sipes and the second crown sipes extend from the circumferential grooves while inclining to one side in the tire circumferential direction.

6. The ire according to claim 2, wherein
the tread portion is provided with a directional tread pattern having an intended tire rotational direction, and
the shoulder land regions are provided with oblique grooves each extending from its axially inner end to outer end, while inclining toward the opposite direction to the intended tire rotational direction.

7. The tire according to claim 1, wherein
the first crown sipes or the second crown sipes are inclined with respect to the tire axial direction.

8. The tire according to claim 7, wherein
the first crown sipes or the second crown sipes are each provided with a major radial portion extending radially outwardly from the bottom of the sipe with a constant width, and a radially outermost radial portion opened at the tread face of the tread portion with a width more than the constant width of the major radial portion.

9. The tire according to claim 1, wherein
the first crown sipes and the second crown sipes extend from the circumferential grooves while inclining to one side in the tire circumferential direction.

10. The tire according to claim 9, wherein
the tire has a tread pattern having an intended rotational direction, and the first crown sipes and the second crown sipes extend from the circumferential grooves while inclining to the opposite direction to the intended rotational direction.

11. The tire according to claim 9, wherein
the first crown sipes or the second crown sipes are each provided with a major radial portion extending radially outwardly from the bottom of the sipe with a constant width, and a radially outermost radial portion opened at the tread face of the tread portion with a width more than the constant width of the major radial portion.

12. The tire according to claim 9, wherein
the first crown sipes and the second crown sipes each have an axially inner end within the crown land region, and
the distances in the tire circumferential direction between the axially inner ends of the first crown sipes and the axially inner ends of the second crown sipes are not more than 5 mm.

13. The tire according to claim 1, wherein
the first crown sipes or the second crown sipes are each provided with a major radial portion extending radially outwardly from the bottom of the sipe with a constant width, and a radially outermost radial portion opened at the tread face of the tread portion with a width more than the constant width of the major radial portion.

14. The tire according to claim 13, wherein the width of the major radial portion is 0.2 to 1.0 mm.

15. The tire according to claim 1, wherein the first crown sipes and the second crown sipes each have an axially inner end within the crown land region, and the distances in the tire circumferential direction between the axially inner ends of the first crown sipes and the axially inner ends of the second crown sipes are not more than 5 mm.

16. The tire according to claim 15, wherein the first crown sipes and the second crown sipes each have an axially inner end within the crown land region, and the distance in the tire axial direction between the axially inner ends of the first crown sipes and the axially inner ends of the second crown sipes is more than the length in the tire axial direction of the first crown sipes and more than the length in the tire axial direction of the second crown sipes.

17. The tire according to claim 1, wherein the first and second crown sipes are inclined at an angle θ6 of not more than 10 degrees with respect to the tire axial direction.

18. The tire according to claim 1, wherein the axial width of the crown land region is in a range from 0.10 to 0.30 times a tread width of the tread portion.

* * * * *